United States Patent
Sano et al.

(10) Patent No.: US 7,849,022 B2
(45) Date of Patent: Dec. 7, 2010

(54) OPTICAL FUNCTIONAL SHEET, AND DISPLAY DEVICE

(75) Inventors: Yoshihiko Sano, Shizuoka (JP); Hideo Nagano, Shizuoka (JP); Ryuichi Katsumoto, Shizuoka (JP); Makoto Koike, Shizuoka (JP); Aya Kuwata, Shizuoka (JP)

(73) Assignee: FUJIFILM Corporation, Tokyo (JP)

( * ) Notice: Subject to any disclaimer, the term of this patent is extended or adjusted under 35 U.S.C. 154(b) by 672 days.

(21) Appl. No.: 11/775,268

(22) Filed: Jul. 10, 2007

(65) Prior Publication Data

US 2008/0013341 A1    Jan. 17, 2008

(30) Foreign Application Priority Data

Jul. 11, 2006    (JP) ............................. 2006-190408

(51) Int. Cl.
   *G06F 15/18*    (2006.01)
(52) U.S. Cl. ............................................ 706/1; 706/62
(58) Field of Classification Search ...................... 706/1
   See application file for complete search history.

(56) References Cited

U.S. PATENT DOCUMENTS

| | | | | |
|---|---|---|---|---|
| 6,937,399 | B2 * | 8/2005 | Takahashi et al. | 359/599 |
| 7,438,450 | B2 * | 10/2008 | Aoki et al. | 362/373 |
| 7,510,314 | B2 * | 3/2009 | Arai et al. | 362/609 |
| 7,658,529 | B2 * | 2/2010 | Aoki et al. | 362/559 |
| 7,667,787 | B2 * | 2/2010 | Mahama et al. | 349/64 |
| 7,724,316 | B2 * | 5/2010 | Maruyama et al. | 349/58 |

(Continued)

FOREIGN PATENT DOCUMENTS

JP    09-054205 A    2/1997

OTHER PUBLICATIONS

Calculating van der Waals-London dispersion spectra and Hamaker coefficients of carbon nanotubes in water from ab initio optical properties, Rajter, R. F.; French, R. H.; Ching, W. Y.; Carter, W. C.; Chiang, Y. M.; Journal of Applied Physics vol. 101 , Issue: 5 Digital Object Identifier: 10.1063/1.2709576 Pub Year: 2007 , pp. 054303-054303-5.*

(Continued)

*Primary Examiner*—Michael Holmes
(74) *Attorney, Agent, or Firm*—Sughrue Mion, PLLC

(57) ABSTRACT

The present invention provides an optical functional sheet and a display device that are capable of keeping a given degree or more of front luminance and are capable of substantially reducing brightness nonuniformity. To this end, the optical functional sheet has a base 3, and prisms 4 arranged in a lattice pattern on at least one surface 3a of the base 3, wherein each of the prisms 4 has two bottoms $L_1$ parallel to a first direction $D_1$, two first inclined surfaces $S_1$ that are inclined so as to face each other, two bottoms $L_2$ parallel to a second direction $D_2$ that is substantially perpendicular to the first direction $D_1$, and two second inclined surfaces $S_2$ that are inclined so as to face each other, and the area $S_{s2}$ of one of the second inclined surfaces $S_2$ to the sum $S_{2s1}$ of the areas of the two first inclined surfaces $S_1$, or the area $S_{s1}$ of one of the first inclined surfaces $S_1$ to the sum $S_{2s2}$ of the areas of the two second inclined surfaces $S_2$ is more than 0.5 times to 2.5 times or less.

6 Claims, 5 Drawing Sheets

U.S. PATENT DOCUMENTS 7,760,291 B2 * 7/2010 Morita et al. .................. 349/69

OTHER PUBLICATIONS

Lexicon-driven handwritten character string recognition for Japanese address reading, Cheng-Lin Liu; Koga, M.; Fujisawa, H.; Document Analysis and Recognition, 2001. Proceedings. Sixth International Conference on Digital Object Identifier: 10.1109/ICDAR.2001.953912 Publication Year: 2001, pp. 877-881.*

Proposal of self-scanning light emitting device (SLED), Kusuda, Y.; Tone, K.; Tanaka, S.; Yamashita, K.; Nagata, H.; Komaba, N.; Electron Devices Meeting, 1989. IEDM '89. Technical Digest., International Digital Object Identifier: 10.1109/IEDM.1989.74186 Publication Year: 1989, pp. 851-854.*

A system for the off-line recognition of handwritten text, Breuel, T.M.; Pattern Recognition, 1994. vol. 2—Conference B: Computer Vision & Image Processing., Proceedings of the 12th IAPR International. Conference on vol. 2 Digital Object Identifier: 10.1109/ICPR.1994.576889 Publication Year: 1994, pp. 129-134 vol. 2.*

* cited by examiner

OPTICAL FUNCTIONAL SHEET, AND DISPLAY DEVICE

FIELD OF THE INVENTION

The present invention relates to an optical functional sheet that is used for displays such as liquid crystal display devices, display apparatuses, and lighting systems, and is provided with functionality of collecting light for improving front luminance of these displays etc. by optical means.

DESCRIPTION OF THE RELATED ART

In recent years, optical functional sheets have been commercially used such as lens films to collect light from light sources like optical wave guides at front side or diffusing sheets to diffuse light in various application fields such as liquid crystal display elements and organic EL.

FIG. 8 is a cross-sectional view showing a configuration of a conventional optical functional sheet as described above.

As shown in FIG. 8, to a transmissive display device such as for a liquid crystal television set, a backlight device 105 having a light source 102 is equipped. A light emitted from the light source 102 is incident on an optical functional sheet 101 (hereinafter, may be sometimes referred to as light-collecting sheet), and part of the incident light is refracted at and transmitted to the optical functional sheet 101 and then changes its emitting direction to be output in the front side direction.

The rest of the incident light is reflected at the optical functional sheet 101 is to be returned in the direction of the light source 102.

The light reflected at the light-collecting sheet 101 is then reflected at surfaces of a diffuser (diffusing sheet) 103 disposed between the light-collecting sheet 101 and the backlight device 105, a light-diffusing sheet 104, the light source 102, etc. to be again incident to the light-collecting sheet 101.

Such a configuration allows a wide dispersion of brightness distribution of a light emitted from the light source 102, and the brightness is lower at the front side, thus the directional property of the conventional optical functional sheet is required to improve by means of the light-collecting sheet light 101 such that the light from the light source provides higher brightness at the front direction.

FIG. 9 is a cross-sectional view showing a light path in a conventional light-collecting sheet.

As shown in FIG. 9, the incident light to the optical functional sheet 101 is divided into a component A that is refracted toward the frond direction, a component B that is reflected toward the light source 102, and a component C that is refracted opposite to rather than toward the front direction.

Among these, the component A is emitted to the front direction, i.e., the viewable direction, thus is an available light indeed.

The reflective component B is diffusively reflected at the surface of the diffusing sheet 104 etc. and turns the incident angle to the light-collecting sheet 101, and is partially transferred into the component A and then emits toward the front direction.

The repeating of the reflection makes almost all the component B converted into the component A, which increases the brightness of the emitting surface at the front direction.

A diffusing sheet 103 is disposed to eliminate brightness nonuniformity caused by a light emitted from the light sources 102 that are arrayed in a line at substantially regular intervals, and there is a shortcoming that the interposition of the diffusing sheet 103 inconveniently reduces the front luminance. In order to eliminate such a reduction in front luminance, a light-collecting sheet is proposed in which a quadrangular pyramid shaped prism array is formed in a lattice pattern on the surface of the light-collecting sheet (see Japanese Patent Application Laid-Open (JP-A) No. 9-54205).

However, even the use of the technique relating to the light-collecting sheet disclosed in Japanese Patent Application Laid-Open (JP-A) No. 9-54205 falls short of satisfactorily ensuring a given degree or more of front luminance as well as eliminating brightness nonuniformity.

Accordingly, an optical functional sheet and a display device that are capable of keeping a given degree or more of front luminance and are capable of substantially reducing brightness nonuniformity have not yet been provided so far, and it is desired to provide such an optical functional sheet and such a display device.

BRIEF SUMMARY OF THE INVENTION

The object of the present invention is to solve the aforementioned problems and to achieve the following purposes. Thus, the present invention aims to provide an optical functional sheet and a display device that are capable of keeping a given degree or more of front luminance and are capable of substantially reducing brightness nonuniformity.

Means to solve the aforementioned problems are as follows. That is, the optical functional sheet of the present invention has a base and prisms that are arranged in a lattice pattern on at least one surface of the base, wherein each of the prisms has two bottoms $L_1$ parallel to a first direction, two first inclined surfaces that are inclined so as to face each other, two bottoms $L_2$ parallel to a second direction substantially perpendicular to the first direction, and two second inclined surfaces that are inclined so as to face each other, and the area of one of the second inclined surfaces is more than 0.5 times to 2.5 times or less the sum of the areas of the two first inclined surfaces.

In the optical functional sheet of the present invention, the prisms are formed on one surface of the base such that the area of one of the second inclined surfaces is more than 0.5 times to 2.5 times or less the sum of the areas of the two first inclined surfaces, and the first direction is set so as to be substantially parallel to the longitudinal direction of rod-shaped light sources that are disposed on the opposite surface of the base. The configuration allows for substantially equalizing the area of a light-collecting surface relating to light diffusability of the light source in the first direction and the area of another light-collecting surface relating to light diffusability of the light source in the second direction and also allows for reducing brightness nonuniformity without impairing the brightness of the optical functional sheet.

The display device of the present invention is provided with an optical sheet and a plurality of rod-shaped light sources, wherein the optical sheet has a base and prisms that are arranged in a lattice pattern on at least one surface of the base, each of the prisms has two bottoms $L_1$ parallel to a first direction, two first inclined surfaces that are inclined so as to face each other, two bottoms $L_2$ parallel to a second direction substantially perpendicular to the first direction, and two second inclined surfaces that are inclined so as to face each other, and the area of one of the second inclined surfaces is more than 0.5 times to 2.5 times or less the sum of the areas of the two first inclined surfaces, and the plurality of rod-shaped light sources are arrayed in a line so as to face to each other on both surfaces of the optical functional sheet so as to face each other in a direction substantially perpendicular to the longitudinal direction thereof.

In the display device of the present invention, in any one of the first direction and the second direction, the optical functional sheet is set such that the sum of the areas of the two inclined surfaces facing to a direction substantially parallel to the longitudinal direction of the light sources is 0.5 times to 2.5 times of less of the area of one of the two inclined surfaces facing to a direction substantially perpendicular to the longitudinal direction of the light sources. The configuration allows for substantially equalizing the area of a light-collecting surface relating to light-diffusability of the light sources in the direction substantially parallel to the longitudinal direction of the light sources and the area of another light-collecting surface relating to light-diffusability of the light sources in the direction substantially perpendicular to the longitudinal direction of the light sources and also allows for reducing brightness nonuniformity without impairing the brightness of the optical functional sheet.

DETAILED DESCRIPTION OF THE INVENTION

Optical Functional Sheet

Figure 1:
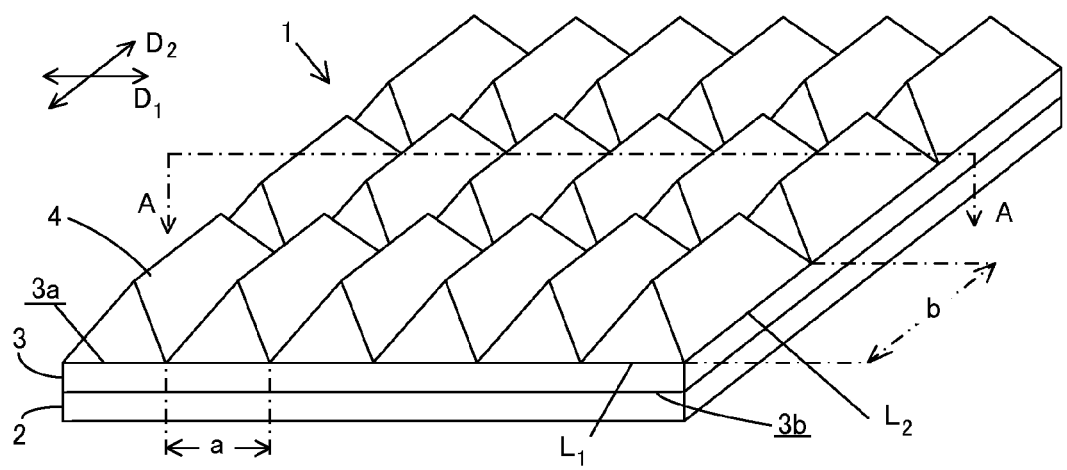
FIG. 1 is a perspective view showing one example of an optical functional sheet of the present invention.

FIG. 1 is a perspective view partially showing a configuration of the optical functional sheet of the present invention. As shown in FIG. 1, an optical functional sheet 1 of the present invention has at least a base 3 on which prisms 4 to be described hereinafter are formed and further has a support 2 that is supporting the base 3.

In this embodiment, the support 2 and the base 3 may be formed from a single resin.

The base 3 has a light incident surface 3b (hereinafter, may be sometimes referred to as reference surface 3b) on which light emitted from light sources such as backlights is incident through the support 2, and a prism-forming surface 3a, on the opposite surface of the base 3, on the prism-forming surface 3a, a plurality of prisms 4 are formed almost allover length thereof to collect light at a given direction.

As a configuration of the optical functional sheet 1, a prism sheet or a lenticular lens is typically used. Besides, diffraction gratings are also exemplified.

The optical functional sheet 1 of the present invention may have other layers such as a light diffusion layer, a back layer, an intermediate layer in accordance with necessity.

<Support>

The shape of the support 2 is not particularly limited and may be suitably selected in accordance with the intended use. Examples of the shape include rectangles, squares, and round shapes.

The structure of the support 2 is not particularly limited and may be suitably selected in accordance with the intended use. For example, a single-layer and a multi-layered structure are exemplified.

The size of the support 2 is not particularly limited and may be suitably selected in accordance with the intended use.

Material of the support 2 is not particularly limited as long as it is transparent and has sufficient strength. For example, resin films, paper such as resin-coated paper and synthetic paper, and metal foils such as aluminum wave may be used.

For material of the resin film, various materials known in the art can be used such as polyethylene, polypropylene, polyvinyl chloride, polyvinylidene chloride, polyvinyl acetate, polyester, polyolefine, acrylate, polystyrene, polycarbonate, polyamide, PET (polyethylene terephthalate), biaxially drawn polyethylene terephthalate, polyethylene naphthalate, polyamideimide, polyimide, aromatic polyamide, cellulose acylate, cellulose triacetate, cellulose acetate propionate, and cellulose diacetate. Of these, it is particularly preferable to use polyester, cellulose acylate, acrylate, polycarbonate or polyolefine.

The width of the support 2 is not particularly limited as long as it does not impair the effect of the support 2, and may be suitably adjusted in accordance with the intended use. For example, a width of 0.1 m to 3 m is typically used.

The length of the support 2 is not particularly limited as long as it does not impair the effect of the support 2, and may be suitably adjusted in accordance with the intended use. For example, a support having a length of 1,000 m to 100,000 m is typically used.

The thickness of the support 2 is not particularly limited as long as it does not impair the effect of the support 2, and may be suitably adjusted in accordance with the intended use. For example, a support having a thickness of 1 μm to 300 μm is typically used.

The average thickness of the support 2 can be measured with, for example, a thickness meter that measures a thickness of a film by sandwiching the film in between measurement sensors, and a non-contact thickness meter that measures thickness using optical interference.

The support 2 composed of one of these materials may be preliminarily subjected to a corona discharge treatment, a plasma treatment, an easy bonding treatment, a heat treatment, and/or a dust removing treatment. The surface roughness "Ra" of the support 2 is preferably 3 nm to 10 nm when the cut-off value is set to 0.25 mm.

Further, for the support 2, a support which is previously provided with a foundation layer such as an adhesive layer and then dried to harden, a support provided with other functional layers formed on the back surface thereof, and the like may be used.

For the structure of the support 2, not only a single-layered support but also a multi-layered support having two or more layers can also be used.

The haze of the support 2 is 50% or less, preferably 40% or less, more preferably 30% or less, and still more preferably 20% or less. When that haze is more than 50%, light concentration efficiency may be significantly degraded.

As used hereinafter, the term "haze" means that percentage of transmitted light which is passing through the specimen deviates from the incident beam be forward scattering, and values thereof can be measured with measurement devices such as HZ-1 (haze meter, manufactured by Suga Test Instruments) following JIS 7105 standard.<Prism>

An optical functional sheet 1 of the present invention has prisms 4 arranged in a lattice pattern on a prism-forming surface 3a formed on a base 3.

Each of the prisms 4, as shown in FIG. 1, has two bottoms $L_1$ in a first direction $D_1$, two first inclined surfaces $S_1, S_1$ that are inclined in a second direction $D_2$ that is perpendicular to the first direction $D_1$ so as to face each other, two bottoms $L_2$ that are parallel to the second direction $D_2$, and two second inclined surfaces $S_2, S_2$ that are inclined in the first direction $D_1$ so as to face each other.

Thus, each of the prisms 4 has two inclined surfaces ($S_1$ and $S_2$) so as to face each other in two directions $D_1$ and $D_2$ which are perpendicular to each other, in other words, has four inclined surfaces ($S_1$, $S_1$, $S_2$ and $S_2$).

Further, the area $S_{s2}$ of one of the second inclined surfaces $S_2$ to the sum of the areas of the two first inclined surfaces $S_1$, $S_1$, or the area $S_{s1}$ of one of the first inclined surfaces $S_1$ to the sum of the areas of the two second inclined surfaces $S_2$, $S_2$ is more than 0.5 times to 2.5 times or less.

Here, the relation between the area of the first inclined surface $S_1$ and the area of the second inclined surface $S_2$ is explained with reference to FIG. 2.

Figure 2:
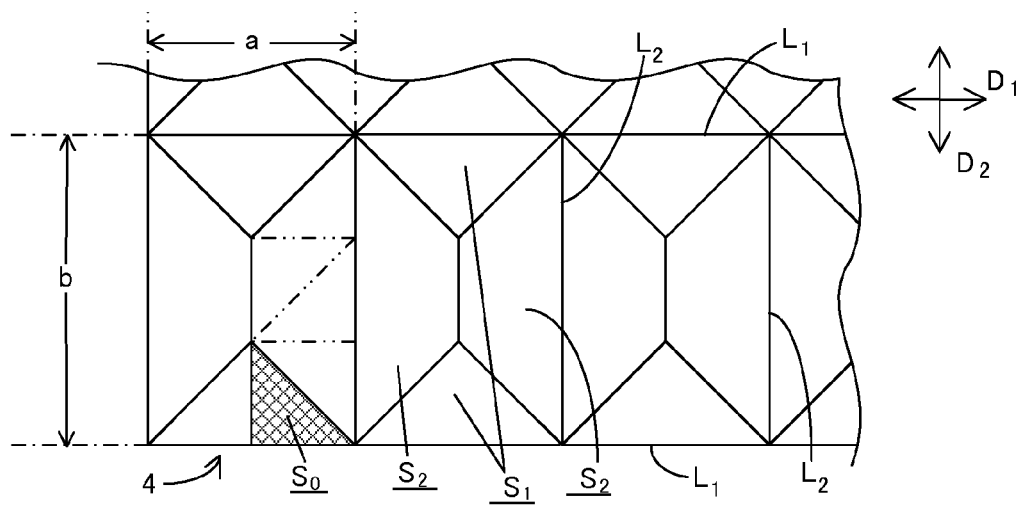
FIG. 2 is a top view showing the shape of prisms of an optical functional sheet of the present invention as viewed from the normal direction of a reference surface of the optical functional sheet.

FIG. 2 is a top view showing one example of the shape of prisms 4 as viewed from the normal direction of a reference surface 3b of the optical functional sheet of the present invention.

As shown in FIG. 2, each of the prisms 4 in this embodiment has first triangular inclined surfaces $S_1$ and second trapezoidal inclined surfaces $S_2$.

When the pitch (length of the bottoms $L_1$ of the first inclined surfaces $S_1$) in the first direction $D_1$ of the prisms arranged in a lattice pattern is defined as "a", the pitch (length of the bottoms $L_2$ of the second inclined surfaces $S_2$) in the second direction $D_2$ of the prisms 4 is defined as "b" and "b" is equal to 1.5 a, the area $S_{S1}$ of the first inclined surface $S_1$ can be represented as "$S_{S1}=2S_0$" using a unit area $S_0$, and the area $S_{S2}$ of the second inclined surface $S_2$ can be represented as "$S_{S2}=4S_0$" using the unit area $S_0$. In FIG. 2, the area representing the unit area $S_0$ is shown with hatching.

For the size of the individual prisms 4, for example, the pitch "a" in the first direction $D_1$ is preferably 10 μm to 100 μm, more preferably 20 μm to 90 μm, and still more preferably 30 μm to 80 μm.

In this embodiment, when a plurality of rod-shaped light sources (not shown) are arrayed in a line so as to be substantially parallel to the first direction $D_1$ and respectively face the reference surface 3b, the longitudinal direction of each of the light sources is substantially parallel to the second direction $D_2$, and thus light emitted from the light sources is diffused by the second inclined surfaces $S_2$, $S_2$ that are inclined to share one upper bottom, like leaning against each other.

At the first inclined surfaces $S_1, S_1$ inclined in the first direction D1 that is substantially perpendicular to the longitudinal direction of the light sources, like leaning against each other, the diffusability of light emitted from the light sources which is diffused by the second inclined surfaces $S_2$, $S_2$ can be more suppressed than that in conventional triangular prisms, and the light emitted from the light sources can be diffused in the second direction $D_2$ that is substantially parallel to the longitudinal direction of the light sources to thereby reduce brightness nonuniformity in the direction where the plurality of light sources are aligned (in the first direction $D_1$).

To reduce the brightness nonuniformity and ensure a given degree or more of brightness, it is particularly preferable that the sum of the areas of the two inclined surfaces facing to the direction substantially parallel to the longitudinal direction of the light sources is more than 0.5 times to 2.5 times or less the area of one inclined surface facing to the direction substantially perpendicular to the longitudinal direction of the light sources, and the sum of the areas of the two inclined surfaces facing to the direction substantially parallel to the longitudinal direction of the light sources is twice the area of one inclined surface facing to the direction substantially perpendicular to the longitudinal direction of the light sources.

When the sum of the areas of the two inclined surfaces facing to the direction substantially parallel to the longitudinal direction of the light source is 0.5 times or less the area of the inclined surface facing to the direction substantially perpendicular to the longitudinal direction of the light sources, the problem with brightness nonuniformity cannot be resolved, although the front luminance can be ensured. When the sum of the areas of the two inclined surfaces is more than 2.5 times the area of the one inclined surface facing to the direction substantially perpendicular to the longitudinal direction, the front luminance significantly degrades.

Further, it is more preferable that each area of the two inclined surfaces that are inclined in the direction substantially perpendicular to the longitudinal direction of the light sources, like leaning against each other, is equal.

<<Shape of Prism>>

Each of prisms 4, as described above, has bottoms $L_1$ parallel to a first direction $D_1$, two first inclined surfaces $S_2$ that are inclined in a second direction $D_2$ so as to face each other, two bottoms $L_2$ parallel to the second direction $D_2$, and two second inclined surfaces $S_2$ that are inclined in the first direction $D_1$ so as to face each other, and the prisms 4 are arranged in a lattice pattern on a prism-forming surface 3a.

Figure 3:
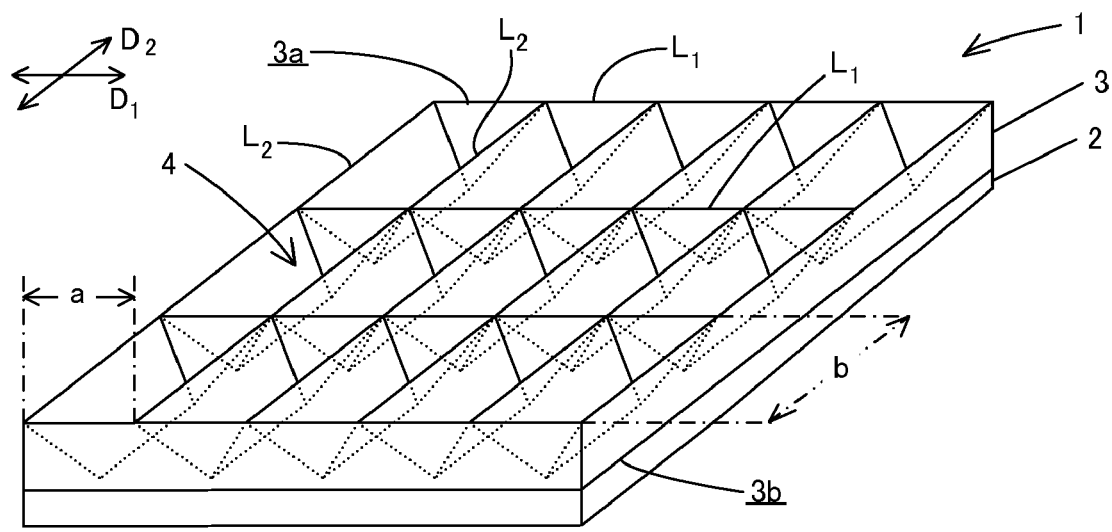
FIG. 3 is a perspective view showing a configuration of the optical functional sheet of the present invention when the shape of each prisms of the optical functional sheet is formed to have a v-shaped concave relative to a prism-forming surface.

The shape of each of the prisms 4 may be formed so as to have a v-shaped convex relative to the prism-forming surface 3a formed on the base 3 (see FIG. 1), or may be formed so as to have a v-shaped concave relative to the prism-forming surface 3a formed on the base 3, as shown in FIG. 3.

In addition, the prisms 4 may be formed such that each prisms 4 having a v-shaped convex relative to the prism-forming surface 3a and each prisms 4 having a v-shaped concave relative to the prism-forming surface 3a are mixed on the prism-forming surface 3a formed on the base 3.

Figure 4:
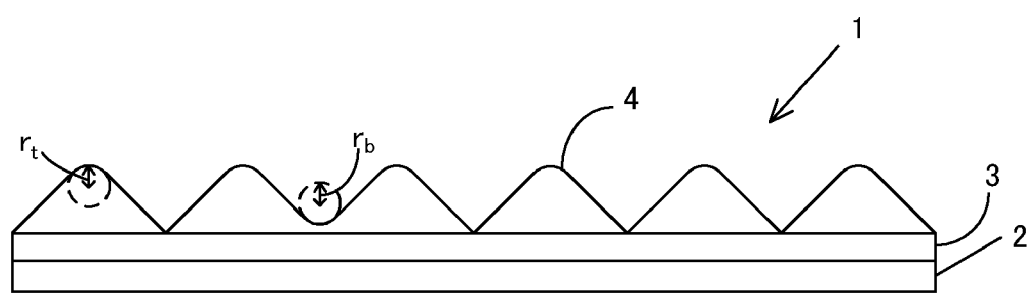
FIG. 4 is a cross-sectional view (cross-sectional view of A-A shown in FIG. 1) showing a configuration of an optical functional sheet of the present invention in which the shape of the optical functional sheet has, in a second direction, prisms each having a rounded top edge and a rounded bottom.

Further, as shown in FIG. 4, in any of the first inclined surface $S_1$ and the second inclined surface $S_2$, a cross-section of each of the prisms 4 in the direction where the two inclined trapezoidal surfaces faces to each other may have a rounded top edge.

Such a prism having a rounded top edge enables an emitted light to diffuse in a direction that the inclined trapezoidal surfaces face to each other, and also enables to widen the view angle in the direction that the two inclined trapezoidal surfaces face to each other.

For the area of an inclined surface having a rounded top edge, a boundary line that includes the highest top edge in the inclined surface from the reference surface 3b and is substantially parallel to the bottom of the inclined surface is calculated as a verge line.

The curvature radius "$r_t$" of a curve formed at the top edge of the cross-section of the prism is preferably 1 μm to 50 μm, 2 μm to 20 μm, and still more preferably 5 μm to 10 μm.

The curvature radius "$r_t$" of a curve formed at the top edge may have a length of 1/10 to 1/2 the height of the top edge of the prism 4, i.e., may have a length of 1/10 to 1/2 the distance from the top edge to the prism-forming surface 3a (when the prism 4 is formed to have a v-shaped convex relative to the prism-forming surface 3a) or a length of 1/10 to 1/2 the distance from the top edge to the reference surface 3b (when the prism 4 is formed to have a v-shaped concave relative to the prism-forming surface 3a).

For the shape of the top edge, the tip of the top edge is torn off in the direction that the two inclined trapezoidal surfaces face to each other, and the cross-sectional shape of the top edge can be checked by using a scanning electron microscope (SEM).

Further, the cross-sectional shape of the prism 4 in the direction that the two inclined trapezoidal surfaces face to each other may be formed to have an obtuse angle (110°, for example).

By adjusting the angle of the cross-sectional shape of the prism 4, the lamp image, i.e., the light intensity density of light emitted from a light source or light sources can be adjusted. In other words, a problem with overlapping of bright portions induced by adjacent cold-cathode tubes can be resolved, thereby the spacing of prisms can be adjusted to be placed at regular intervals. Therefore, the angle of the cross-sectional shape of the prisms can be set to an arbitrary value according to the design of the used backlight.

The configuration of prisms 4 described above is not limited to a structure where the prisms 4 each having a v-shaped convex are formed on the prism-forming surface 3a, and is also applicable to a structure where the prisms 4 each having a v-shaped concave are formed relative to the prism-forming surface 3a, similarly.

In addition, in any of the two first inclined surface $S_1$ and the two second inclined surface $S_2$, a cross-section of each of the prisms as viewed in a direction that the two inclined trapezoidal surfaces face to each other may have a rounded top edge.

Such a prism having a rounded top enables an emitted light to diffuse in a direction that the two inclined trapezoidal surface faces to each other, and also enables to widen the view angle in the direction that the two inclined trapezoidal surfaces face to each other.

As described above, the use of the configuration that the cross-section of each of the prisms 4 has a rounded top edge as viewed in the direction that the two inclined trapezoidal surfaces face to each other can yield further effects on the view angel widening effect.

The area of an inclined surface having a rounded bottom can be calculated using a boundary line that includes the highest top from the reference surface 3b in the inclined surface and is substantially parallel to the bottoms of the inclined surface as a verge line.

The curvature radius "$r_b$" of a curve formed at the top of the cross-section of the prism is preferably 1 μm to 50 μm, 2 μm to 20 μm, and still more preferably 5 μm to 10 μm.

The curvature radius "$r_b$" of the curve formed at the top edge of the cross-section of the prism may have a length 10/1 to 1/2 the height of the top edge of the prism 4, i.e., may have a length of 1/10 to 1/2 the distance from the top edge to the prism-forming surface 4a (when the prism 4 is formed to have a v-shaped convex) or a length of 1/10 to 1/2 the distance from the top edge to the reference surface 3b (when the prism 4 is formed to have a v-shaped concave).

The shape of the bottom can also be torn off in the direction that the two inclined trapezoidal surfaces face to each other and can be checked using a scanning electron microscope (SEM).

Also, the configuration of prisms 4 described above is not limited to a structure where the prisms 4 each having a v-shaped convex are formed on the prism-forming surface 3a, and is also applicable to a structure where the prisms 4 each having a v-shaped concave are formed relative to the prism-forming surface 3a, similarly.

The average thickness of the base 3 is not particularly limited and may be a suitable thickness in accordance with the intended use, provided that it is within the range of thickness typically used for the base 3. The average thickness of the base 3 is preferably 50 μm to 500 μm, more preferably 100 μm to 400 μm, and still more preferably 150 μm to 300 μm. The average thickness of the base 3 can be measured similarly to the average thickness of the support 2.

Material of the prism 4 (base 3) is not particularly limited, however, it is preferable to use a resin having a high refractive index from the perspective of enhancing front luminance.

Examples of such a resin include resins containing aromatic ring structure such as benzene ring and naphthalene ring, and organic compounds containing high-content of halogen and sulfur such as Br, and Cl.

When the resin is used as a UV curable resin, resins in which a compound having the above-noted structure and further containing a reactive group such as (meth)acryloyl group, vinyl group, and epoxy group is mixed with a compound generating active species such as radical and cation which is capable of reacting the reactive group-containing compound by exposure to radiation with ultraviolet ray, etc. is exemplified.

Of these, from the perspective of quick curability, a combination of a reactive group-containing compound (monomer) that contains an unsaturated group such as (meth)acryloyl group, and vinyl group with a photoradical polymerization initiator that generates a radical by effect of light is preferable.

For the reactive group-containing compound, a reactive group-containing compound, for example, (meth)acryloyl group, vinyl group, and epoxy group, and a compound that generates active species such as radical and cation which is capable of reacting the reactive group-containing compound by exposure to radiation with ultraviolet ray, etc. can be used.

Of these, from the perspective of quick curability, a combination of a reactive group-containing compound (monomer) that contains an unsaturated group such as (meth)acryloyl group, and vinyl group with a photoradical polymerization initiator that generates a radical by effect of light is preferable. Further, of these resins, it is preferable to use a (meth)acryloyl group-containing compound such as (meth)acrylate, urethane(meth)acrylate, epoxy(meth)acrylate, and polyester(meth)acrylate.

For the (meth)acryloyl group-containing compound, it is possible to use a compound containing one (meth)acryloyl group or two or more acryloyl groups.

Each of the reactive group-containing compound (monomer) that contains an unsaturated group such as (meth)acryloyl group, and vinyl group may be used alone or two or more reactive group-containing compounds (monomers) may be mixed together for use.

Examples of the (meth)acryloyl group-containing compound include, as a monofunctional monomer containing only one (meth)acryloyl group-containing compound, isobonyl(meth)acrylates, bonyl(meth)acrylates, tricyclodecanyl (meth)acrylate, dicyclopentanyl(meth)acrylates, dicyclopentenyl(meth)acrylate, cyclohexyl(meth)acrylates, benzyl (meth)acrylates, 4-butylcyclohexyl(meth)acrylates, acryloylmorpholine, 2-hydroxyethyl(meth)acrylates, 2-hydroxypropyl(meth)acrylates, 2-hydroxybutyl(meth)acrylates, methyl(meth)acrylates, ethyl(meth)acrylates, propyl (meth)acrylates, isopropyl(meth)acrylates, butyl(meth)acrylates, amyl(meth)acrylates, isobutyl(meth)acrylates, t-butyl(meth)acrylates, pentyl(meth)acrylates, isoamyl (meth)acrylates, hexyl(meth)acrylates, heptyl(meth)acrylates, octyl(meth)acrylates, isooctyl(meth)acrylates, 2-ethylhexyl(meth)acrylates, nonyl(meth)acrylates, decyl(meth)acrylates, isodecyl(meth)acrylates, undecyl(meth)acrylates, dodecyl(meth)acrylates, lauryl(meth)acrylates, stearyl (meth)acrylates, buthoxyethyl(meth)acrylates, ethoxydiethylene glycol(meth)acrylates, polyethylene glycol mono (meth)acrylates, polypropylene glycol mono(meth)acrylates, methoxyethylene glycol(meth)acrylates, ethoxyethyl(meth) acrylates, methoxypolyethylene glycol(meth)acrylates, and methoxypolypropylene glycol(meth)acrylates.

Further, examples of the monofunctional monomer having an aromatic ring include phenoxyethyl(meth)acrylates, phenoxy-2-methylethyl(meth)acrylates, phenoxyethoxyethyl (meth)acrylates, 3-phenoxy-2-hydroxypropyl(meth)acrylates, 2-phenylphenoxyethyl(meth)acrylates, 4-phenylphenoxyethyl(meth)acrylates, 3-(2-phenylphenyl)-2-hydroxypropyl(meth)acrylates, (meth)acrylates of p-cumylphenol reacted with ethyleneoxide, 2-bromophenoxyethyl(meth)acrylates, 4-bromophenoxyethyl(meth) acrylates, 2,4-dibromophenoxyethyl(meth)acrylates, 2,6-dibromophenoxyethyl(meth)acrylates, 2,4,6-tribromophenyl (meth)acrylates, and 2,4,6-tribromophenoxyethyl(meth) acrylates.

Examples of commercially available products of the monofunctional monomers having an aromatic ring include ARONIX M113, M110, M101, M102, M5700, and TO-1317 (all manufactured by TOA GOSEI CO., LTD.); BISCOAT #192, #193, #220, and 3BM (all manufactured by OSAKA ORGANIC CHEMICAL INDUSTRY LTD); NK ESTER AMP-10G and AMP-20G (all manufactured by Shin-Nakamula Chemical Co., Ltd.); LIGHT-ACRYLATE PO-A, P-200A, EPOXY ESTER M-600A, and LIGHT ESTER PO (all manufactured by KYOEISHA CHEMICAL Co., Ltd); NEW FRONTIER PHE, CEA, PHE-2, BR-30, BR-31, BR-31M, and BR-32 (all manufactured by Dai-ichi Kogyo Seiyaku Co., Ltd.).

Examples of the unsaturated monomer having two (meth)acryloyl groups in a molecule thereof include alkyldiol diacrylates such as 1,4-butanediol diacrylate, 1,6-hexanediol diacrylate, 1,9-nonandiol diacrylate; polyalkylene glycol diacrylates such as ethylene glycol di(meth)acrylate, tetraethylene glycol diacrylate, and tripropylene glycol diacrylate; neopentyl glycol di(meth)acrylate, and tricyclodecane methanol diacrylate.

Examples of unsaturated monomers having a bisphenol skeleton include ethyleneoxide-added bisphenol A (meth) acrylic acid esters, ethyleneoxide-added tetrabromobisphenol A (meth)acrylic acid esters, propyleneoxide-added bisphenol A (meth)acrylic acid esters, propyleneoxide-added tetrabromobisphenol A (meth)acrylic acid esters, bisphenol A epoxy(meth)acrylates that can be obtained by an epoxy ring-opening reaction between bisphenol A diglycidyl ether and (meth)acrylic acid, tetrabromobisphenol A epoxy(meth) acrylates that can be obtained by an epoxy ring-opening reaction between tetrabromobisphenol A diglycidyl ether and (meth)acrylic acid, bisphenol F epoxy(meth)acrylates that can be obtained by an epoxy ring-opening reaction between bisphenol F diglycidyl ether and (meth)acrylic acid, and tetrabromobisphenol F epoxy(meth)acrylates that can be obtained by an epoxy ring-opening reaction between tetrabromobisphenol F diglycidyl ether and (meth)acrylic acid.

Examples of commercially available products of the unsaturated monomers having the above-noted structure include BISCOAT #700 and #540 (all manufactured by OSAKA ORGANIC CHEMICAL INDUSTRY LTD); ARONIX M-208 and M-210 (all manufactured by TOA GOSEI CO., LTD.); NK ESTER BPE-100, BPE-200, BPE-500, and A-BPE-4 (all manufactured by Shin-Nakamula Chemical Co., Ltd.); LIGHT-ESTER BP-4EA, BP-4PA, EPOXY ESTER 3002M, 3002A, 3000M and 300A (all manufactured by KYOEISHA CHEMICAL Co., Ltd.); KAYARAD R-551 and R-712 (all manufactured by Nippon Kayaku Co., Ltd.); BPE-4, BPE-10 and BR-42M (all manufactured by Dai-ichi Kogyo Seiyaku Co., Ltd.); REPOXY VR-77, VR-60, VR-90, SP-1506, SP-1507, SP-1509 and SP-1563 (all manufactured by Showa High Polymer Co., Ltd.); and NEOPOL V779 and NEOPOL V779MA (all manufactured by Japan U-PiCA Co., Ltd).

Further, examples of trifunctional or more (meth)acrylate unsaturated monomers include (meth)acrylates of trivalent or more polyvalent alcohols such as trimethylolpropane tri (meth)acrylates, pentaerythritol tri(meth)acrylates, trimethylolpropane trioxyetheyl(meth)acrylates, and tris(2-acryloyloxyethyl) isocyanurates. Examples of the commercially available products thereof include ARONIX M305, M309, M310, M315, M320, M350, M360 and M408 (all manufactured by TOAGOSEI CO., LTD.); BISCOAT #295, #300, #360, GPT, 3PA and #400 (all manufactured by OSAKA ORGANIC CHEMICAL INDUSTRY LTD.); NK ESTER TMPT, A-TMPT, A-TMM-3, A-TMM-3L and A-TMMT (all manufactured by Shin-Nakamula Chemical Co., Ltd.); LIGHT ACRYLATE TMP-A, TMP-6EO-3A, PE-3A, PE-4A and DPE-6A (all manufactured by KYOEISHA CHEMICAL Co., Ltd); and KAYARAD PET-30, GPO-303, TMPTA, TPA-320, DPHA, D-310, DPCA-20 and DPCA-60 (all manufactured by Nippon Kayaku Co., Ltd.).

Besides, urethane(meth)acrylate oligomer may be blended with the material of the prism 4 (base 3).

Examples of the urethane(meth)acrylate include polyether polyols such as polyethylene glycol, and polytetramethyl glycol; polyester polyols that can be obtained by a reaction between a dibasic acid such as succinic acid, adipic acid, azelaic acid, sebacic acid, phthalic acid, tetrahydro phthalic anhydride, or hexahydro phthalic anhydride and a diol such as ethylene glycol, propylene glycol, diethylene glycol, triethylene glycol, tetraethylene glycol, dipropylene glycol, 1,4-butanediol, 1,6-hexanediol, or neopentyl glycol; poly-ε-caprolactone-modified polyol, polymethyl valerolactone-modified polyol; alkyl polyols such as ethylene glycol, propylene glycol, 1,4-butanediol, 1,6-hexanediol, and neopentyl glycol; alkylene oxide having a bisphenol A skeleton-modified polyols such as ethyleneoxide added bisphenol A, and propylene oxide added bisphenol A; alkylene oxide having a bisphenol F skeleton-modified polyols such as ethyleneoxide added bisphenol F such as propylene oxide added bisphenol F; or urethane(meth)acrylate oligomers that can be produced from the mixtures thereof, an organic polyisocyanate such as tolylene diisocyanate, isophorone diisocyanate, hexamethylene diisocyanate, diphenylmethane diisocyanate, and xylylene diisocyanate, and a hydroxy group-containing (meth)acrylate such as 2-hydroxyethyl(meth)acrylate, and 2-hydroxypropyl(meth)acrylate. Of these, urethane(meth)

acrylate oligomer is preferable from the perspective that it can maintain the viscosity of a curable composition in an appropriate range. Examples of commercially available monomers of these urethane(meth)acrylates include ARONIX M120, M-150, M-156, M-215, M-220, M-225, M-240, M-245 and M-270 (all manufactured by TOA GOSEI CO., LTD.); AIB, TBA, LA, LTA, STA, BISCOAT #155, IBXA, BISCOAT #158, #190, #150, #320, HEA, HPA, BISCOAT #2000, #2100, DMA, BISCOAT #195, #230, #260, #215, #335HP, #310HP, #310HG and #312 (all manufactured by OSAKA ORGANIC CHEMICAL INDUSTRY LTD); LIGHT-ACRYLATE IAA, L-A, S-A, BO-A, EC-A, MTG-A, DMP-A, THF-A, IB-XA, HOA, HOP-A, HOA-MPL, HOA-MPE, LIGHT-ACRYLATE 3EG-A, 4EG-A, 9EG-A, NP-A, 1,6HX-A and DCP-A (all manufactured by KYOEISHA CHEMICAL Co., Ltd); KAYARAD TC-110S, HDDA, NPGDA, TPGDA, PEG400DA, MANDA, HX-220 and HX-620 (all manufactured by Nippon Kayaku Co., Ltd.); FA-511A, 512A and 513A (all manufactured by Hitachi Chemical Co., Ltd.); VP (manufactured by BASF); and ACMO, DMAA and DMA-PAA (all manufactured by KOHJIN Co., Ltd.).

Note that a urethane (meth)acrylate oligomer can be obtained as a reactant from (a) hydroxy group-containing (meth)acrylate, (b) organic polyisocyanate, and (c) polyol, and a reactant is preferable which can be obtained by reacting (a) hydroxy group-containing (meth)acrylate with (b) organic polyisocyanate, and then reacting the reaction product with (c) polyol.

Each of these unsaturated monomers may be used alone or two or more may be mixed for use in accordance with necessity.

Examples of the photoradical polymerization initiator include acetophenone, acetophenon benzyl ketal, 1-hydroxy cyclohexyl phenylketone, 2,2-dimethoxy-2-phenylacetophenon, xanthone, fluolenone, benzaldehyde, fluorene, anthraquinone, triphenylamine, carbazole, 3-methylacetophenone, 4-chlorobenzophenone, 4,4'-dimethoxybenzophenone, 4,4'-diaminobenzophenone, Michler's ketone, benzoin propyl ether, benzoin ethyl ether, benzyl dimethyl ketal, 1-(4-isopropylphenyl)-2-hydroxy-2-methyl propane-1-on, 2-hydroxy-2-methyl-1-phenylpropane-1-on, thioxanthone, diethylthioxanthone, 2-ixopropylthioxanthone, 2-chlorothioxanthone, 2-methyl-1-[4-(methylthio)phenyl]-2-morpholino-propane-1-on, 2,4,6-trimethylbenzoil diphenyl phosphine oxide, bis-(2,6-dimethoxybenzoil)-2,4,4-trimethylpentyl phosphine oxide, and ethyl-2,4,6-trimethylbenzoil ethoxyphenyl phosphine oxide.

Examples of commercially available products of the photoradical polymerization initiators include IRGACURE 114, 369, 651, 500, 119, 907, 714, 2959, CGI1700, CGI1750, CGI11150, CG24-61, DAROCURL 116 and 1173 (all manufactured by Chiba Specialty Chemicals K.K.); LUCIRIN LR 1728 and 1193X (all manufactured by BASF); UBECRYL P36 (manufactured by UCB Co., Ltd.); and KIP 150 (manufactured by LANBELTY CORPORATION). Of these photoradical polymerization initiators, LUCIRIN LR1193X is preferable from the perspective of high-solubility because of its liquid form and high-sensitivity.

The photoradical polymerization initiator is preferably blended in a content of 0.01% by mass to 10% by mass, and particularly preferably in a content of 0.5% by mass to 7% by mass in the total content of the composition. The upper limit of the content of the photoradical polymerization initiator is preferably 10% by mass or less in terms of hardenability of the composition, and dynamic properties, optical properties, and handling ability of the hardened material. The lower limit of the content of the photoradical polymerization initiator is preferably 0.01% by mass or more in terms of preventing reduction in hardening rate of the composition.

In the composition, a photosensitizer may be further blended. Examples of the photosensitizer include triethylamine, diethylamine, N-methyldiethanolamine, ethanolamine, 4-dimethylamino benzoate, 4-dimethylamino methyl benzoate, 4-dimethylamino ethyl benzoate, and 4-dimethylamino isoamyl benzoate. Examples of commercially available products thereof include UBECRYL P102, 103, 104 and 105 (all manufactured by UCB Co., Ltd.).

Besides the components stated above, various additives may be further added in accordance with necessity, such as antioxidant, ultraviolet absorber, light stabilizer, silane coupling agent, coated surface improver, thermal polymerization inhibitor, leveling agent, surfactant, colorant, storage stabilizer, plasticizer, lubricant, solvent, filler, anti-aging agent, wet property improver, and releasing agent.

Examples of commercially available products of the anti-aging agent include IRGANOX 1010, 1035, 1076 and 1222 (all manufactured by Chiba Specialty Chemicals K.K.); and ANTIGEN P, 3C, FR, and GA-10 (all manufactured by Sumitomo Chemical Co., Ltd.).

Examples of commercially available products of the ultraviolet absorber include TINUVIN P, 234, 320, 326, 327, 328, 329 and 213 (all manufactured by Chiba Specialty Chemicals K.K.); and SEESORB 102, 103, 110, 501, 202, 712 and 704 (all manufactured by SHIPRO KASEI KAISHA LTD.).

Examples of commercially available products of the photostabilizer include TINUVIN 292, 144 and 622LD (all manufactured by Chiba Specialty Chemicals K.K.); SANOL LS770 (manufactured by Sankyo Co., Ltd.); and SUMISORB TM-061 (manufactured by Sumitomo Chemical Co., Ltd.).

Examples of the silane coupling agent include γ-aminopropyl triethoxy silane, γ-mercaptopropyl trimethoxy silane, and γ-methacryloxypropyl trimethoxy silane. Examples of commercially available products thereof include SH6062 and 6030 (all manufactured by DOW CORNING TORAY SILICONE CO., LTD.); and KBE903, 603 and 403 (all manufactured by Shin-Etsu Chemical Co., Ltd.).

Examples of the coated surface improver include silicone additives such as dimethyl siloxane polyether, and nonionic fluorochemical surfactants.

Examples of commercially available products of the silicone additives include DC-57 and DC-190 (all manufactured by Dow Corning Co., Ltd.); SH-28PA, SH-29PA, SH-30PA and SH-190 (all manufactured by DOW CORNING TORAY SILICONE CO., LTD.); KF351, KF352, KF353 and KF354 (all manufactured by Shin-Etsu Chemical Co., Ltd.); and L-700, L-7002, L-7500 and FK-024-90 (all manufactured by Nippon Unicar Co., Ltd.).

Examples of commercially available products of the nonionic fluorochemical surfactants include FC-430 and FC-171 (all manufactured by Sumitomo 3M Ltd.); and MEGAFAC F-176, F-177 and R-08 (all manufactured by Dainippon Ink and Chemicals, Inc.).

Examples of commercially available products of the releasing agent include PLYSURF A208F (manufactured by Dai-ichi Kogyo Seiyaku Co., Ltd.).

An organic solvent used to adjust the viscosity of the resin solution is not particularly limited as long as it can be mixed with the resin solution without causing unevenness such as precipitates, phase-separation, and white turbidity. Examples of such an organic solvent include acetone, methylethylketone, methylisobutylketone, ethanol, propanol, butanol, 2-methoxyethanol, cyclohexanol, cyclohexane, and toluene. Two or more of the organic solvents may be mixed for use in accordance with necessity.

When an organic solvent is added to the resin solution, it requires a step for drying and evaporate the organic solvent during manufacturing process of the product, however, when a large amount of unevaporated organic solvent remains in the product, there are concerns that the mechanical properties of the product degrade, and the organic solvent evaporates and diffuses during use of the product to exude strong odors and to adversely affect health. For this reason, for the organic solvent, an organic solvent having a high-boiling point is unfavorable because the amount of residual solvent is high.

However, with the use of an organic solvent having an excessively low boiling point, the surface condition of the composition is coarse; dew condensation water adheres on the surface of the composition by vaporization heat to cause sheet defects; and the vapor concentration of the composition is increased to cause the increased risk such as catching-fire.

Therefore, the boiling point of the organic solvent is preferably within the range of 50° C. to 150° C., and more preferably 70° C. to 120° C. From the perspective of solubility and boiling point of a material used for the organic solvent, methylethylketone (boiling point: 79.6° C.), and 1-propanol (boiling point: 97.2° C.), etc. are preferable.

The added amount of the organic solvent to the resin solution in the present invention depends on the type of the solvent and the viscosity of the resin solution to which no solvent has not been added yet, however, to sufficiently improve coating property of the composition, it is typically within the range of 10% by mass to 40% by mass, and preferably within the range of 15% by mass to 30% by mass.

An excessively small amount of the organic solvent added to the resin solution cannot be very effective in reduction in viscosity as well as in increasing coated amount, resulting in insufficient coating property.

However, when the resin solution is diluted with an excessively large amount of the organic solvent, it causes the following problems. The solution flows over the sheet because of its excessively low viscosity to cause sheet nonuniformity, and the solution flows over the surface of the sheet to the back surface thereof. The resin solution can be prepared by mixing the respective components set force above by a common procedure and can be prepared, in accordance with necessity, by heating and dissolution.

The viscosity of the thus prepared resin solution is typically 10 mPa·s/25° C. to 50,000 mPa·s/25° C.

When a resin solution having an excessively high viscosity is supplied to a base or an embossing roller, it is difficult to feed the composition at a constant feeding rate, and when a lens is manufactured, it is difficult to obtain a lens having a desired lens thickness because of induced coating nonuniformity, wavy portions, and mixed-in air bubbles, thereby it cannot sufficiently exert the performance as a lens. The above-noted tendency is conspicuous when the process line is speeded up.

Therefore, when the process line is needed to speed-up, the viscosity of the resin solution is typically 10 mPa·s to 100 mPa·s, and more preferably 10 mPa·s to 50 mPa·s.

Such a low viscosity of the resin solution can be adjusted by adding an appropriate amount of the organic solvent thereto. The viscosity of the resin solution can also be adjusted by keeping the heat of the coating solution.

In contrast, when the viscosity of the resin solution that the solvent has been evaporated is excessively low, it is difficult to control the lens thickness when the resin solution is embossed with an embossing roller, and there may be cases where a uniformly formed lens that has a certain thickness cannot be formed. Thus, the viscosity of the resin solution is preferably 100 mPa·s to 3,000 mPa·s.

When an organic solvent is mixed in the resin solution, the resin solution can be uniformly supplied with a low viscosity when the resin solution is supplied, and when the resin solution is embossed, the resin solution with a high viscosity can be uniformly embossed by drying the organic solvent contained therein.

Here, the hardened material that can be obtained by hardening the resin solution particularly preferably has the following properties. First, the hardened material preferably has a refractive index of 1.55 or more, and more preferably 1.56 or more. When the refractive index of the hardened material is less than 1.55 and an optical functional sheet is formed with the use of the composition, there may be cases where sufficient front luminance cannot be ensured.

Secondarily, the hardened material preferably has a softening point of 40° C. or more, and particularly preferably 50° C. or more. When the softening point of the hardened material is less than 40° C., the heat resistance of the hardened material may be sometimes insufficient.

Further, a high-refractive material can also be used by adding an inorganic fine particle material having a high-refractive index to the resin solution. Examples of such a high-refractive inorganic material include Si (refractive index=3.5), $TiO_2$ (refractive index=2.2 to 2.7), $CeO_2$ (refractive index=2.2), $ZrO_2$ (refractive index=2.1), $In_2O_3$ (refractive index=2.0), $La_2O_3$ (refractive index=1.95), $SnO_2$ (refractive index=1.9), $Y_2O_3$ (refractive index=1.12) and $Sb_2O_5$ (refractive index=2.09 to 2.29).

For the particle diameter of the inorganic fine particles having a high-refractive index, it is preferably that the smaller particle diameter, the higher transparency of the resin. Specifically, the particle diameter of the high-refractive inorganic fine particles is preferably 100 nm or less, more preferably 50 nm or less, and still more preferably 20 nm or less.

The high-refractive inorganic fine particles may be mixed in a commonly used UV curable resin for use. A UV curable resin having a further high refractive index can be obtained by mixing the high-refractive inorganic particles in a UV curable resin having a high-refractive index as described above.

The haze of the prisms 4 is preferably 50% or less, more preferably 40% or less, still more preferably 30% or less, and still further more preferably 20% by mass. When that haze is more than 50%, light concentration efficiency may significantly degrade.

[Light Diffusion Layer]

In the present invention, a light diffusion layer (not shown in the drawings) may be formed between the support 2 and the base 3, in accordance with necessity. The light diffusion layer can be formed by applying a coating solution which is composed of a resin, a volatile liquid and particles over the surface of the support 2 and drying the applied coating solution.

The components of the coating solution include a resin, a volatile liquid and particles. And it may contain other components in accordance with necessity.

The resin is not particularly limited and may be suitably selected in accordance with the intended use. Examples thereof include acrylate resins and styrene-butadiene resins.

Examples of the volatile liquid include methyl ethyl ketones (MEK), cyclohexanones, toluenes, and water.

The shape of the particles may be spherical, elliptical sphere or comma-shaped.

The average particle diameter of the particles is preferably larger than the average thickness of the dried coated layer, that is, it is preferably in the range of 0.5 μm to 50 μm.

The average particle diameter can be measured with a measurement device using, for example, a dynamic light scattering method or a laser diffraction method.

The particles are not particularly limited and may be suitably selected in accordance with the intended use. Examples of the particles include organic particles and inorganic particles.

The organic particles are not particularly limited and may be suitably selected in accordance with the intended use. Examples of the organic particles include polymethyl methacrylate resin particles, melamine resin particles, polystyrene resin particles and silicone resin particles. Each of these organic particles may be used alone or in combination with two or more.

The organic particles preferably have a cross-linked structure.

Preferred examples of the organic particles having a cross-linked structure include acrylic resin particles that have a cross-linked structure.

The inorganic particles are not particularly limited and may be suitably selected in accordance with the intended use. Examples of the inorganic particles include particles of talcs, calcium carbonates, silicones and aluminas. Each of these inorganic particles may be used alone or in combination with two or more.

The added amount of the particles is preferably in the range of 0.01 parts by mass to 1,000 parts by mass, and more preferably 1 part by mass to 10 parts by mass to 100 parts by mass of the resin. When the added amount of the particles is less than 0.01 parts by mass, the particles may not serve as a light diffusion agent, and when the added amount of the particles is more than 1,000 parts by mass, particles may not be sufficiently dispersed.

The ratio of the refractive index of the resin to the refractive index of the particles is not particularly limited and may be suitably adjusted in accordance with the intended use. For example, the ratio of ratio of the refractive index of the resin to the refractive index of the particles of a D line having a wavelength of 589 nm measured at 25° C. is preferably in the range of 0.9 to 1.1, and more preferably 0.95 to 1.05.

When the ratio of the refractive indexes of the resin and particles is less than 0.9 or more than 1.1, the amount of reflected light component may be large at boundary surfaces of the particles and resin, resulting in a reduction in transmittance of light.

The other components are not particularly limited and may be suitably selected in accordance with the intended use. Examples thereof include particle-anti-settling agents, fluorochemical surfactants, light scattering agents, thickeners, cationic surfactants, anionic surfactants, curing agents, crosslinkers, photopolymerization initiators and monomers.

Examples of the particle-anti-settling additives include fatty amides, polyethylene oxides, metallic soaps, organic bentonites and hydrogenated castor oil waxes. Of those anti-settling additives, fatty acid amides and polyethylene oxides are preferable. Each of these additives may be used alone or in combination with two or more.

Since the light scattering agent serves as a light diffusing agent similarly to the above-mentioned particles, they can further improve light diffusion property.

The average particle diameter of the light scattering agent is not particularly limited and may be suitably selected in accordance with the intended use. For example, it is preferably in the range of 1 μm to 5 μm.

The average particle diameter of the light scattering agent is not particularly limited and can be measured with a measurement device using, for example, a dynamic light scattering method or a laser diffraction method.

Materials of the light scattering agents are not particularly limited, and can be selected from, for example, silicas, calcium carbonates, aluminas and zirconias.

The added amount of the light scattering agent in the coating solution is not particularly limited and may be suitably adjusted in accordance with the intended use. For example, it is preferably in the range of 1 part by mass to 20 parts by mass to the total amount of the coating solution.

The thickener is not particularly limited and may be suitably selected in accordance with the intended use. Examples thereof include polyacrylamides and amine salts.

The added amount of the thicker is preferably in the range of 0.1 parts by mass to 10 parts by mass to 100 parts by mass of the resin.

The fluorochemical surfactant is not particularly limited and may be suitably selected in accordance with the intended use. Examples thereof include anionic fluorochemical surfactants and amphoteric fluorochemical surfactants.

The added amount of the fluorochemical surfactant is preferably in the range of 0.001 parts by mass to 0.1 parts by mass to 100 parts by mass of the resin.

The surface tension of the coating solution is preferably 40N/m or less, and more preferably 30N/m or less. When the surface tension is more than 40N/m, the surface condition of the coated layer may be degraded.

The surface tension of the coating solution can be measured with, an automatic surface tension meter, for example, (CBVP-A3 manufactured by Kyowa Interface Science Co., Ltd.).

The viscosity of the coating solution is not particularly limited and may be suitably adjusted in accordance with the intended use. For example, it is preferably in the range of 5 mPa·s to 200 mPa·s, and more preferably 10 mPa·s to 150 mPa·s at 25° C. When the viscosity of the coating solution is less than 5 mPa·s, it may be difficult to maintain sufficient particle-sedimentation, and when the viscosity is more than 200 mPa·s, the solution sending property and coating property of the coating solution and surface condition of the coated solution may be degraded.

The viscosity of the coating solution can be measured with, for example, a type-E viscometer (ELD type viscometer manufactured by Tokyo Keiki Co., Ltd.).

The concentration of solid content in the coating solution is not particularly limited and may be suitably adjusted in accordance with the intended use. It is preferably in the range of 10 parts by mass to 40 parts by mass, and more preferably 20 parts by mass to 30 parts by mass to 100 parts by mass of the coating solution.

(Method for Producing Optical Functional Sheet)

A method of forming prisms 4 on the support 2 in manufacturing the optical functional sheet 1 is not particularly limited and may be suitably selected from conventional methods in accordance with the intended use. Examples of the forming method include (1) forming prisms by feeding a resin sheet extruded from a die in between an embossing (transfer) roller that has a reversed pattern of the prisms 4 on the surface thereof and a nip roller to tightly press the resin sheet in between the embossing (transfer) roller and the nip roller to thereby transfer a convexoconcave shape (or a reversed pattern of the prisms 4) formed on the surface of the embossing roller i.e. the shape of the prisms 4 to the surface of the resin sheet. The embossing (transfer) roller rotates at almost same speed as the extrusion speed of the resin sheet. And the nip roller is placed facing the embossing roller.

Additionally, for the forming method, (2) a method is also exemplified in which a transfer mold or a stamper having a reversed pattern of the prisms 4 on the surface thereof is placed on a resin plate in a laminate structure, and the resin plate is pressed using a hot press to thermally transfer the reversed pattern to have the shape of the prisms 4 on the resin plate surface, thereby producing an optical functional sheet 1 with the prisms 4 formed thereon.

For a resin material used in the above-noted method for producing an optical film, thermoplastic resins can be preferably used.

Examples of the thermoplastic resins include polymethyl methacrylate resins (PMMA), polycarbonate resins, polystyrene resins, MS resins, AS resins, polypropylene resins, polyethylene resins, polyethylene terephthalate resins, polyvinyl chloride resins (PVC), cellulose acylates, cellulose triacetates, cellulose acetate propionates, cellulose diacetates, thermoplastic elastomers or copolymers thereof; and cycloolefin polymers.

For other methods for producing an optical functional sheet, (3) a method is also exemplified in which convexoconcaves, i.e., a reversed pattern of the prisms 4 formed on the surface of an embossing roller is transferred to a surface of a transparent film formed from polyester, cellulose acylate, acryl, polycarbonate, polyolefin or the like to form prisms 4 on the transparent film, thereby producing an optical functional sheet 1.

More specifically, it is possible to employ a method for producing a convexoconcave sheet in which an adhesive and a resin are applying over a surface of a transparent film so as to have two or more layers composed of an adhesive layer and a resin layer (the resin layer is formed, for example, from a UV curable resin), the transparent film is continuously fed to and wound around a rotating embossing roller to transfer convexoconcaves formed on the surface of the embossing roller to the resin layer, and the resin layer is hardened in a condition where the transparent film is wound round the embossing roller, for example, by a ultraviolet irradiation method.

Note that the adhesive layer is not necessarily provided when the adhesion between the resin layer and the transparent film is sufficiently ensured.

A method of enhancing the adhesion instead of providing an adhesive layer is not particularly limited as long as it is a method that enables to enhance the adhesion between the resin layer and the transparent film. Examples of the method of enhancing the adhesion include a method in which an undercoat layer is formed on a surface of a transparent layer and a method in which a surface of a transparent film is subjected to an activation treatment such as corona treatment.

Besides the above-mentioned methods for producing an optical functional sheet 1, a method (4) is also exemplified in which a resin layer is applied over the surface of an embossing roller that has a reversed pattern of an optical functional sheet to be produced, the transparent film is continuously fed in between an embossing roller and a nip roller to make the transparent film stick together with the embossing roller with convexoconcaves formed thereon, and then the transparent film is hardened by a ultraviolet irradiation method or the like. Also in the method, the same method of enhancing adhesion between the resin layer and the transparent film as described above can be used.

For the transparent film (support) used in the method, a resin film can be preferably used. Examples of materials used for the resin film include polyethylenes, polypropylenes, polyvinyl chlorides, polyvinylidene chlorides, polyvinyl acetates, polyesters, polyolefins, acryls, polystyrenes, polycarbonates, polyamides, PET (polyethylene terephthalates), biaxially drawn polyethylene terephthalates, polyethylene naphthalates, polyvinyl naphthalenes, polyamideimides, polyimides, aromatic polyamides, cellulose acylates, cellulose triacetates, cellulose acetate propionates, and cellulose diacetates. Of these, polyesters, cellulose acylates, acryls, polycarbonates and polyolefins are particularly preferable.

As another example of the method for producing an optical functional sheet, a method is further exemplified in which a metal mold with a pattern of prisms 4 formed thereon is placed on a support 2, and a resin containing the abovementioned components is poured into the metal mold to thereby form prisms 4 on the support 4.

In such case, the support 2 and the prisms 4 are formed into a single piece, rather than forming the prisms 4 on the support 2 using an embossing roller.

In the method for producing an optical functional sheet 1 of the present invention, in any one of the two first inclined surfaces $S_1$ and the two second inclined surfaces $S_2$, each of prisms 4 has a cross-section having a rounded bottom as viewed in a direction that the two inclined trapezoidal surfaces face to each other. Thus, the method for producing an optical functional sheet 1 may include, after the resin (a first resin) is peeled off from the embossing roller, forming a second resin (not shown) by applying the second resin between two prisms 4, 4 and hardening the applied second resin under a nitrogen atmosphere.

<Method for Producing Optical Functional Sheet>

Figure 5:
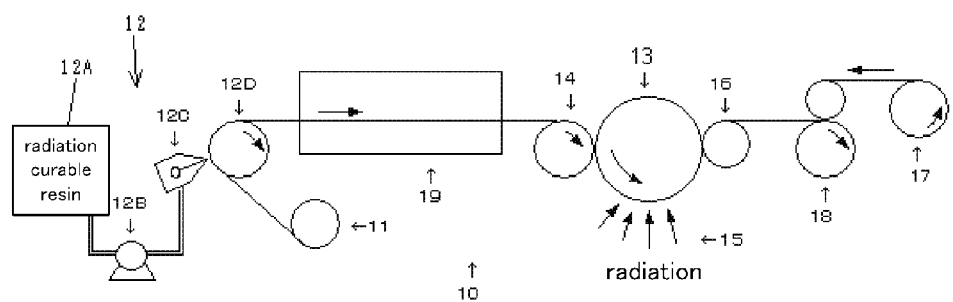
FIG. 5 is a schematic view showing a configuration of a production apparatus used in the method for producing an optical functional sheet of the present invention.

FIG. 5 is a schematic view showing a configuration of a production apparatus used in the method for producing an optical functional sheet of the present invention.

As shown in FIG. 5, a production apparatus 10 for producing an optical functional sheet of the present invention is equipped with a support-sheet supplying unit 11 configured to supply a support-sheet to the production apparatus 10, a coating unit 12 configured to coat the supplied support with a coating solution or a base, an embossing roller 13 used for forming convexoconcaves (prisms 4) on the coating solution or the base, a nip roller 14, a resin-hardening unit 15 configured to harden the coating solution or the base, a protective film supplying unit 17, a sheet-rewinding unit 18 configured to rewind an optical functional sheet 1, and a drying unit 19.

The support-sheet supplying unit 11 for supplying a sheet is a unit to send a sheet W (support 2) to the production apparatus 10 and is composed of a sending roller around which the sheet W is wound.

The coating unit 12 is a device configured to apply a radiation curable resin over a surface of the sheet W and is composed of a supply source 12A that supplies a radiation curable resin, a feeding unit (pump) 12B, a coating head 12C, a support roller 12D around which the sheet W is wound, when applying the radiation curable resin over the surface of the sheet W, to thereby support the sheet W, and a tube used for supplying the radiation curable resin supply source 12A to the coating head 12C.

In the embodiment shown in FIG. 5, a coating head that is of an extrusion type die coater is used.

For the drying unit 19, various units based on various conventional methods can be employed, provided that it enables to evenly dry the coating solution applied over a surface of the sheet W, like a tunnel drier as shown in FIG. 5. For example, as the drying unit 19, various drying units can be used such as a drying unit based on a radiation heating method, a hot air circulation method, a far-infrared radiation method, a vacuum method or the like.

The embossing roller 13 is required to have such precision for forming convexoconcave patterns, mechanical strength, circularity and the like that convexoconcaves formed on the roller surface can be transferred to and formed on a surface of the sheet W. For such an embossing roller 13, a metal roller is preferably used.

On the outer circumference surface of the embossing roller 13, a regular fine convexoconcave pattern is formed. It is required that the regular fine convexoconcave pattern be formed in a reversed shape of a fine convexoconcave pattern (see FIG. 1) formed on a prism-forming surface 3a of the optical functional sheet 1 as a product.

For a method of forming a regular fine convexoconcave pattern on the outer circumference surface of the embossing roller 13, the following various methods can be employed. Namely, a method of subjecting the surface of the embossing roller 13 with a diamond cutting tool (with a single point); a method of directly forming convexoconcaves on the surface of the embossing roller 13 by photo-etching, electron beam drawing, laser processing, light modeling method or the like; and a method in which convexoconcaves are formed on a surface of a thin metal plate by photo-etching, electron beam drawing, laser processing, light modeling method or the like and the plate is wound around a roller so as to be fixed, and the roller is used as an embossing roller 13.

Besides, a method may also be employed in which convexoconcaves are formed on a surface of a material that is more easily processable than metal by photo-etching, electron beam drawing, laser processing, light modeling method or the like, a reversed pattern of the shape of the convexoconcaves was formed on a thin metal plate by electroforming, and the plate is wound around a roller so as to be fixed, which is used as an embossing roller 13. When a reverse pattern is formed by electroforming, there is an advantage that a plurality of same shape plates can be obtained with one original plate (mother plate).

The surface of the embossing roller 13 is preferably subjected to a releasing treatment.

As described above, an embossing roller 13 whose surface is subjected to a releasing treatment can maintain the shape of the fine convexoconcave pattern in good condition. For the releasing treatment, various conventional methods can be used, such as a coating treatment with the use of a fluorine resin.

It is preferable that the embossing roller 13 is provided with a drive unit. The embossing roller 13 is driven to rotate, as indicated by an arrow in FIG. 5, in a counterclockwise (CCW) direction.

The nip roller 14 is used for process the sheet W in a roller forming method while pressing the sheet W by working together with the embossing roller 13 in pairs, and the nip roller 14 is required to have a given mechanical strength, a given circularity and the like.

When the longitudinal elastic modulus (Young's modulus) of the surface of the nip roller 14 is excessively small, the result of the roller forming process is insufficient, and when the longitudinal elastic modulus is excessively large, the nip roller 14 susceptibly reacts to foreign material inclusion to easily cause defects. Thus, it is preferable to set the longitudinal elastic modulus to an appropriate value.

The nip roller 14 is preferably provided with a drive unit.

The nip roller 14 is driven to rotate, as indicated by an arrow in FIG. 5, in a clockwise (CW) direction.

To give a given pressing force between the embossing roller 13 and the nip roller 14, a pressurizing unit is preferably provided to any one of the embossing roller 13 and the nip roller 14.

Similarly, a fine-adjusting unit is preferably provided to any one of the embossing roller 13 and the nip roller 14 so as to exactly control the clearance and the pressure between the embossing roller 13 and the nip roller 14.

The resin hardening unit 15 is a radiation irradiating unit disposed to face the embossing roller 13 at the downstream of the nip roller 14. The resin hardening unit 15 is configured to harden a resin layer through the sheet W by radiation irradiation, and it is preferable that the resin hardening unit 15 can irradiate the sheet W with radiation ray in accordance with the curability of the resin and with an amount of radiation ray in accordance the conveying speed of the sheet W.

For the resin hardening unit 15, a columnar irradiation lamp having a substantially same length as the width of the sheet W may be used, for example.

Also, a plurality of columnar irradiation lamps may be arrayed in parallel. On the back surface of the columnar irradiation lamps, a reflecting plate may also be provided.

A peel roller 16 is coupled with the embossing roller 13 to peel off the sheet W from the embossing roller 13 and is required to have a given mechanical length and a given circularity.

At the peeling position, the sheet W wound around the surface of the embossing roller 13 is peeled off from the embossing roller 13 to be wound around the peel roller 16 while the sheet W is sandwiched in between the rotating embossing roller 13 and the rotating peel roller 16.

To ensure the operation, it is preferable that the peel roller 16 is equipped with a drive unit. The peel roller 16 is driven to rotate, as indicated by an arrow in FIG. 5, in a clockwise (CW) direction.

When the temperature of the resin or the like is increased by the hardening, a configuration is employed in which a cooling unit is provided to the peel roller 16 to cool the sheet W at the time of peeling thereof and then to ensure the peeling.

Note that a configuration may be employed in which a plurality of back-up rollers (not shown in the figure) are arranged so as to face each other in the area from the position pressed by the embossing roller 13 (position of 9 o'clock) to the peeling position (position of 3 o'clock), and the resin is hardened while pressing the sheet W with the plurality of back-up rollers and the embossing roller 13.

The sheet-rewinding unit 18 is used for house the peeled sheet W and is composed of a rewinding roller to rewind the sheet W. On the sheet-rewinding unit 18, a protective film H supplied from the protective film supplying unit 17 which is arranged adjacent to the sheet-rewinding unit 18 is supplied onto the surface of the sheet W and both of the films, i.e., the sheet W and the protective film H are rewound around the sheet-rewinding unit 18 in a condition where the protective film H is superimposed on the sheet W.

In the optical functional sheet production apparatus 10, guide rollers for forming a conveying path for the sheet W may be provided between the coating unit 12 and the embossing roller 13 and between the peel roller 16 and the sheet-rewinding unit 18, and the like. Besides, in accordance with necessity, tension rollers and the like may also be provided therebetween to absorb sheet surface waviness caused during conveyance of the sheet W.

EXAMPLES

Hereafter, the present invention will be further described in detail referring to specific Examples and Comparative Examples, however, the present invention is not limited to the disclosed Examples.

Example 1

Production of Optical Functional Sheet

<Preparation of Coating Solution>

The following composition was placed in a mixing tank. The composition was stirred with heating at 50° C. to dissolve the individual components, thereby a coating solution was prepared. After hardening, the coating solution had a refractive index of 1.59.

| [Composition of the Resin Liquid] | |
|---|---|
| EB3700 (*1) | 60 parts by mass |
| BPE200 (*2) | 20 parts by mass |
| BR-31 (*3) | 100 parts by mass |
| M-110 (*4) | 20 parts by mass |
| LR1193X (*5) | 1 part by mass |
| MEK (*6) | 40 parts by mass |

EB3700 (*1): EBECRYL3700 manufactured by DAICEL-CYTEC COMPANY LTD., bisphenol A type epoxy acrylate (viscosity: 2,200 mPa·s/65° C.)

BPE200 (*2): NK ESTER BPE-200 manufactured by Shin-Nakamula Chemical Co., Ltd., ethylene oxide added bisphenol A methacrylic acid ester (viscosity: 590 mPa·s/25° C.)

BR-31 (*3): NEW FRONTIER BR-31 manufactured by Dai-ichi Kogyo Seiyaku Co., Ltd., tribromophenoxyethyl acrylate which is solid at room temperature and has a melting point of 50° C. or more)

M-110 (*4): ARONIX M-110 manufactured by TOAGOSEI CO., LTD., (meth)acrylate of p-cumylphenol reacted with ethylene oxide (viscosity: 150 mPa·s/25° C.)

LR1193X (*5): radical generator, LUCIRIN LR1193X manufactured by BASF Corporation, ethyl-2,4,6-trimethyl benzoyl ethoxyphenyl phosphine oxide)

MEK (*6): methylethylketone

Next, a support 2 was prepared. Then, an optical functional film 1 was produced using a production apparatus having a configuration shown in FIG. 5.

A transparent PET (polyethylene terephthalate) film which was 500 mm wide and 100 μm thick was used for the support 2.

As an embossing roller 13, a roller which was 700 mm long (in the width direction of the support 2) and 300 mm in diameter made with S45C, a carbon steel and covered with nickel was used. On the entire circumference of the roller which was about 500 mm long, a convexoconcave (groove) pattern which was a reversed pattern of a fine convexoconcave (groove) pattern (see FIG. 1) formed on a prism-forming surface 3a of an optical functional sheet 1 as a product was formed by a cutting process using a diamond cutting tool (with a single point).

The fine convexoconcave (groove) pattern prepared in Example 1 of the present invention was formed based on the assumption that each of prisms 4 was constituted by two first inclined surfaces $S_1$ that were respectively formed in a substantially triangular shape and two second inclined surfaces $S_2$ that were respectively formed in a substantially trapezoidal shape such that the area $S_{s2}$ of the second inclined surface $S_2$ was twice the area $S_{s1}$ of the first inclined surface $S_1$, i.e., the optical functional sheet 1 was placed in a display device such that the longitudinal direction of rod-shaped light sources respectively disposed facing to a reference surface 3b was substantially parallel to a second direction $D_2$, and the ratio between the sum $S_{2s1}$ of the two first inclined surfaces $S_1$ and the area $S_{s2}$ of one of the second inclined surfaces $S_2$ was represented by 1:1.

The circumferential surface of the embossing roller 13 was plated with nickel after the cutting process for forming the grooves.

A die coater using an extrusion type coating head 12C was used as a coating unit 12.

A resin liquid having the same composition as the optical functional sheet was used as a coating solution. The supplied amount of the coating solution (resin liquid) to the coating head 12C was controlled using a supply device 12B such that the film thickness of the coating solution (resin liquid) of which the organic solvent had been dried was 20 μm.

A circulating hot air dryer was used as a drying unit 19. The temperature of hot air in the dryer was set at 100° C.

A roller which was 200 mm in diameter covered with a silicone rubber layer with rubber hardness of 90 degrees was used as a nip roller 14. The nip pressure, the effective pressure applied to the support 2 from the embossing roller 13 and the nip roller 14, was set to 0.5 MPa.

A metal halide lamp was used as a resin hardening unit 15. The resin was irradiated with radiation energy of 1,000 mJ/cm$^2$.

In the processes described above, an optical functional sheet 1 which is 50 cm wide and 100 cm long having a pattern such as that shown in FIG. 1 was produced.

<Display Device provided with Optical Functional Sheet>

The prepared optical functional sheet 1 was set to a liquid crystal display panel of a liquid crystal display device. The optical functional sheet was set in the liquid crystal display device such that the second direction $D_2$ was substantially parallel to the longitudinal direction of light sources (e.g. cold-cathode tubes) serving as a backlight incorporated in the liquid crystal display device.

<Evaluation on Front Luminance and Brightness Nonuniformity>

Figure 6:
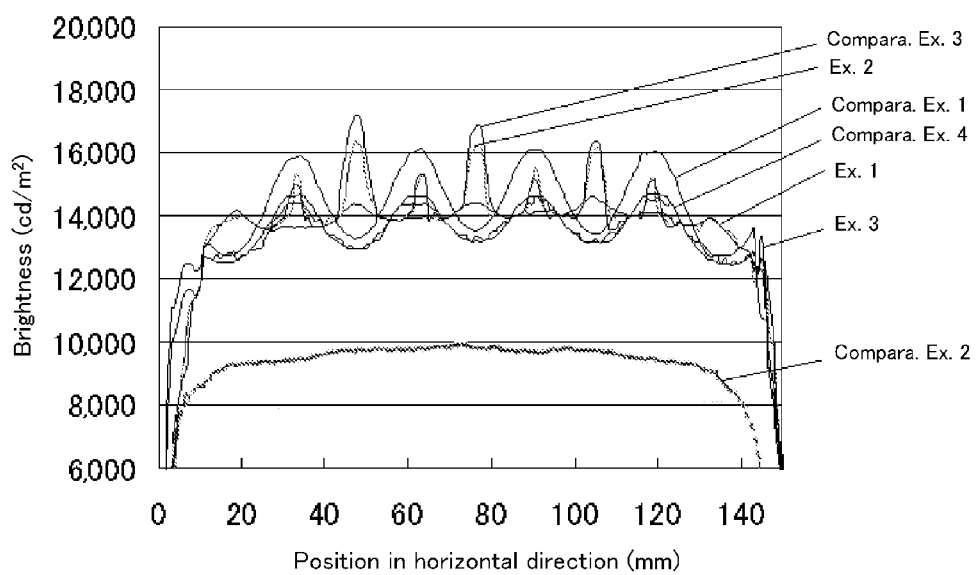
FIG. 6 is a graph showing evaluation results of front luminance and brightness nonuniformity on respective optical functional sheets of Example 1 and Comparative Examples 1 to 4 arranged in a liquid crystal display device.

As a photodetector, a luminance meter was set at the optical functional sheet 1 to emit a light from the backlight (cold-cathode tubes) set at the liquid crystal display device. A value measured at the angle 0° as viewed when scanning the pattern in the range of angle ±90° by means of the photodetector and measuring an emitted light angular distribution of a light emitted from the optical functional sheet 1 was regarded as a front luminance. FIG. 6 shows the results of the front luminance distribution and a brightness nonuniformity distribution of the optical functional sheet in the horizontal direction of the display surface of the liquid crystal display device.

Note that the center-to-center spacing of the respective cold-cathode tubes (CCFL) was set to 29 mm, a transparent acryl plate having a thickness of 4 mm was placed under the optical functional sheet 1, and the distance between the transparent acryl plate and the center of the cold-cathode tubes was set to 17 mm.

Example 2

Preparation of Optical Functional Sheet and Evaluation

An optical functional sheet 1 was prepared in the same manner as in Example 1 except that in the preparation of an optical functional sheet of Example 1, the surface shape of the embossing roller 13 was selected so as to form the shape of convex portions of respective prisms 4 such that the area $S_{s2}$ of one of the two second inclined surfaces $S_2$ was 0.6 times the sum $S_{2S1}$ of the areas of the two first inclined surfaces $S_1$.

The obtained optical functional sheet 1 was placed in the liquid crystal display device in the same manner as in Example 1 and then evaluated as to front luminance and brightness nonuniformity in the same manner as in Example 1. Table 6 shows the evaluation results.

Example 3

Preparation of Optical Functional Sheet and Evaluation

An optical functional sheet 1 was prepared in the same manner as in Example 1 except that in the preparation of an optical functional sheet of Example 1, the surface shape of the embossing roller 13 was selected so as to form the shape of convex portions of respective prisms 4 such that the area $S_{S2}$ of one of the two second inclined surfaces $S_2$ was 2.5 times the sum $S_{2S1}$ of the areas of the two first inclined surfaces $S_1$.

The obtained optical functional sheet 1 was placed in the liquid crystal display device in the same manner as in Example 1 and then evaluated as to front luminance and brightness nonuniformity in the same manner as in Example 1. Table 6 shows the evaluation results.

COMPARATIVE EXAMPLE 1

Preparation of Optical Functional Sheet and Evaluation

Figure 7:
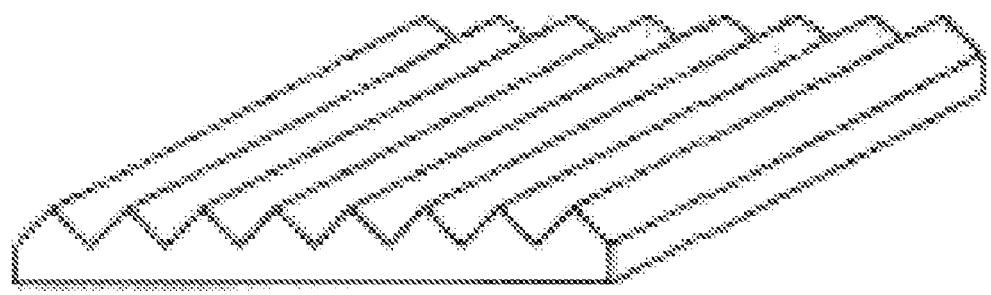
FIG. 7 is a perspective view showing a configuration of a conventional light-collecting sheet.
Figure 8:
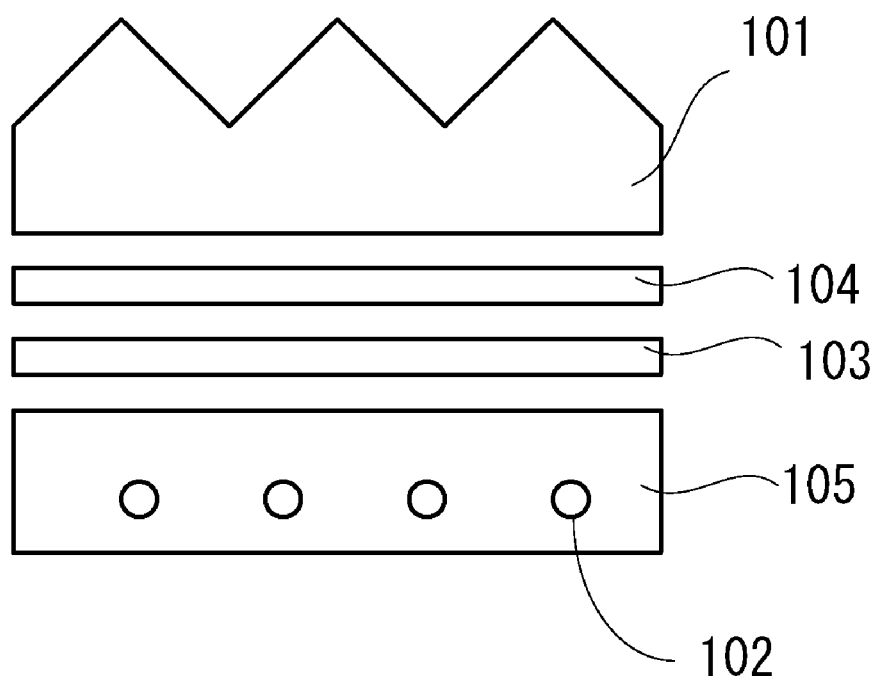
FIG. 8 is a cross-sectional view showing a configuration of a conventional display device.
Figure 9:
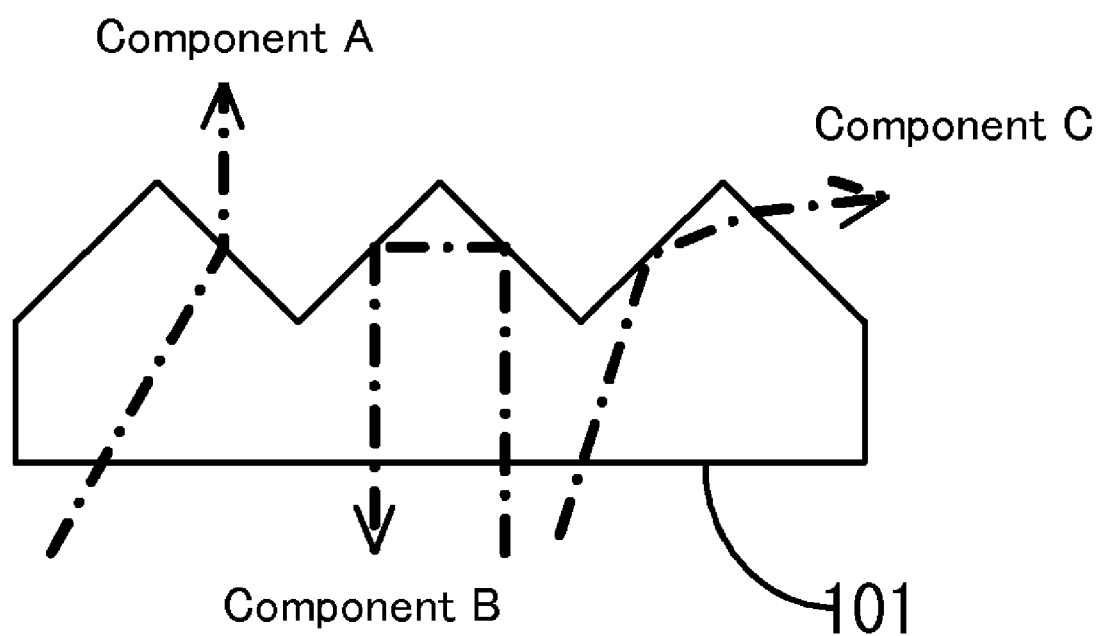
FIG. 9 is a schematic illustration showing a light path in a conventional light-collecting sheet.

An optical functional sheet 1 was prepared in the same manner as in Example 1 except that in the preparation of an optical functional sheet of Example 1, the surface shape of the embossing roller 13 was selected such that the shape of convex portions of respective prisms 4 was formed in a triangular prism which was elongated in only one direction as shown in FIG. 7.

The obtained optical functional sheet 1 was placed in the liquid crystal display device in the same manner as in Example 1 and then evaluated as to front luminance and brightness nonuniformity in the same manner as in Example 1. Table 6 shows the evaluation results.

COMPARATIVE EXAMPLE 2

Preparation of Optical Functional Sheet and Evaluation

A liquid crystal display device was structured in the same manner as in Comparative Example 1 except that a diffuser having a thickness of 2 mm was disposed between the optical functional sheet 1 prepared in Comparative Example 1 and the light sources arrayed on the side of support 2 of the optical functional sheet 1. Then, the optical functional sheet was evaluated as to front luminance and brightness nonuniformity in the same manner as in Example 1. Table 6 shows the evaluation results.

COMPARATIVE EXAMPLE 3

Preparation of Optical Functional Sheet and Evaluation

An optical functional sheet 1 was prepared in the same manner as in Example 1 except that in the preparation of an optical functional sheet of Example 1, the surface shape of the embossing roller 13 was selected to a quadrangular pyramid shape such that the area $S_{2s1}$ of one of the second inclined surfaces $S_2$ was 0.5 times the sum of the areas $S_{2s1}$ of the two first inclined surfaces $S_1$.

The obtained optical functional sheet 1 was placed in the liquid crystal display device in the same manner as in Example 1 and then evaluated as to front luminance and brightness nonuniformity in the same manner as in Example 1. Table 6 shows the evaluation results.

COMPARATIVE EXAMPLE 4

Preparation of Optical Functional Sheet and Evaluation

An optical functional sheet 1 was prepared in the same manner as in Example 1 except that in the preparation of an optical functional sheet of Example 1, the surface shape of the embossing roller 13 was adjusted such that the area $S_{s2}$ of one of the second inclined surfaces $S_2$ was 2.6 times the sum of the areas $S_{2s1}$ of the two first inclined surfaces $S_1$.

The obtained optical functional sheet 1 was placed in the liquid crystal display device in the same manner as in Example 1 and then evaluated as to front luminance and brightness nonuniformity in the same manner as in Example 1. Table 6 shows the evaluation results.

As shown in FIG. 6, the optical functional sheet 1 prepared in Example 1 allowed for obtaining excellent luminance properties while keeping a given degree or more luminance and reducing brightness nonuniformity as compared to the optical functional sheets prepared in Comparative Examples 1 to 4.

As compared to the evaluation results of the optical functional sheet of Example 1, the optical functional sheet of Comparative Example 1 was formed such that the plurality of convex portions were arrayed in only one direction, and thus brightness nonuniformity was obviously recognized, although the front luminance was substantially compensated.

The optical functional sheet of Comparative Example 2 showed a substantial decrease in front luminance, although a diffuser was used to reduce brightness nonuniformity caused by the optical functional sheet employed in Comparative Example 1.

Since a quadrangular prism shape was employed in the optical functional sheets of Comparative Examples 3 to 4, a certain degree of brightness could be ensured, however, it was impossible to reduce the brightness nonuniformity.

As explained above, since the optical functional sheet of the present invention can achieve both of ensuring a given degree or more brightness and reducing brightness nonuniformity, it is unlikely to need to reduce the haze value of a diffuser and set up a diffuser in a liquid crystal display device. As the result, the optical functional sheet of the present invention enables to simplify the structure of liquid crystal display devices, reduce the light energy of light sources, as well as to reduce power consumption.

As a result that the optical functional sheet of the present invention can simplify the structure of liquid crystal display devices and reduce the light energy of light sources, the optical functional sheet allows for reducing power consumption. Thus, the optical functional sheet of the present invention can be particularly preferably used in, for example, large size liquid crystal display devices of 40 inches or more.

What is claimed is:
1. An optical functional sheet, comprising:
a base, and prisms arranged in a lattice pattern on at least one surface of the base, wherein each of the prisms has two bottoms $L_1$ parallel to a first direction, two first inclined surfaces that are inclined so as to face each other, two bottoms $L_2$ parallel to a second direction that is substantially perpendicular to the first direction, and two second inclined surfaces that are inclined so as to face each other, and the area of one of the second inclined surfaces is more than 0.5 times to 2.5 times or less the sum of the areas of the two first inclined surfaces, and wherein any of the two first inclined surfaces and the two second inclined surfaces are respectively formed in a trapezoidal shape, sharing one upper bottom thereof, and the two inclined surfaces other than those formed in a trapezoidal shape are respectively formed in a triangular shape.

2. The optical functional sheet according to claim 1, wherein the each of the prisms is formed to be any one of a convex shape and a concave shape relative to one surface of the base.

3. The optical functional sheet according to claim 1, wherein in any of the two first inclined surfaces and the two second inclined surfaces, each of the prisms has a cross-section having a rounded top edge as viewed in a direction that the two inclined trapezoidal surfaces face to each other.

4. The optical functional sheet according to claim 1, wherein in any of the two first inclined surfaces and the two second inclined surfaces, each of the prisms has a cross-section having a rounded bottom as viewed in the direction that the two inclined trapezoidal surfaces face to each other.

5. The optical functional sheet according to claim 1, wherein a plurality of rod-shaped light sources are arrayed in a line so as to face each other on a surface and the opposite surface of the optical functional sheet, and in any one of the first direction and the second direction, the sum of the areas of the two inclined surfaces in a direction substantially parallel to the longitudinal direction of the rod-shaped light sources is more than 0.5 times to 2.5 times or less the area of one of the two inclined surfaces facing in a direction substantially perpendicular to the longitudinal direction of the rod-shaped light sources.

6. A display device, comprising:

an optical functional sheet, and a plurality of rod-shaped light sources, wherein the optical functional sheet comprises a base, and prisms arranged in a lattice pattern on at least one surface of the base, wherein each of the prisms has two bottoms $L_1$ parallel to a first direction, two first inclined surfaces that are inclined so as to face each other, two bottoms $L_2$ parallel to a second direction that is substantially perpendicular to the first direction, and two second inclined surfaces that are inclined so as to face each other, and the area of one of the second inclined surfaces is more than 0.5 times to 2.5 times or less the sum of the areas of the two first inclined surfaces; and the plurality of rod-shaped light sources are arrayed in a line so as to face each other on a surface and the opposite surface of the optical functional sheet, in parallel in a direction substantially perpendicular to the longitudinal direction of the rod-shaped light sources.

* * * * *